May 16, 1939.   A. KÖNIG   2,158,507
TELESCOPE OBJECTIVE
Filed June 12, 1937

$n_D$
I = 1.5209
II = 1.6646
III = 1.5163

$\nu_D$
I = 60.2
II = 35.7
III = 64.0

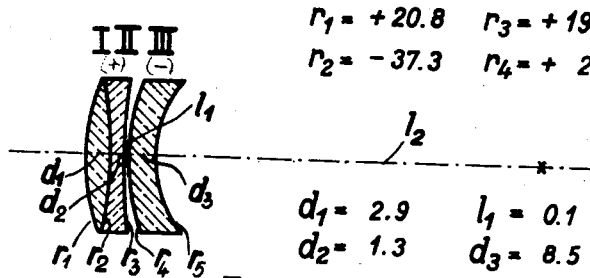

$r_1 = +20.8 \quad r_3 = +195.0 \quad r_5 = +12.01$
$r_2 = -37.3 \quad r_4 = +21.4$ $d_1 = 2.9 \quad l_1 = 0.1 \quad l_2 = 71.0$
$d_2 = 1.3 \quad d_3 = 8.5$

Fig. 1

$n_D$
IV = 1.6031
V = 1.5687
VI = 1.6646

$\nu_D$
IV = 60.7
V = 63.1
VI = 35.7

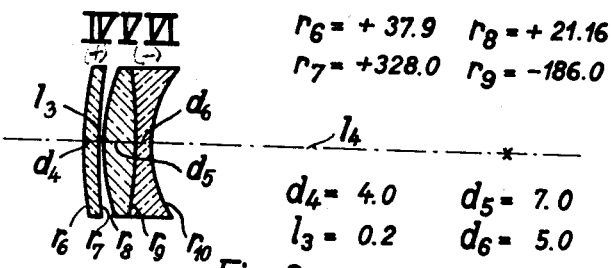

$r_6 = +37.9 \quad r_8 = +21.16 \quad r_{10} = +14.88$
$r_7 = +328.0 \quad r_9 = -186.0$ $d_4 = 4.0 \quad d_5 = 7.0 \quad l_4 = 66.6$
$l_3 = 0.2 \quad d_6 = 5.0$

Fig. 2

$n_D$
VII = 1.5725
VIII = 1.6200
IX = 1.5163
X = 1.5688

$\nu_D$
VII = 57.5
VIII = 36.3
IX = 64.0
X = 56.0

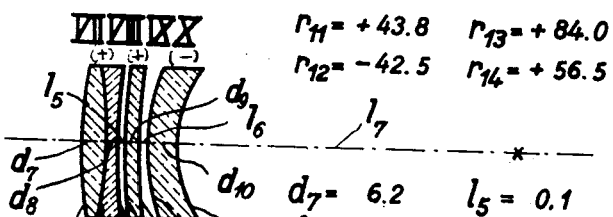

$r_{11} = +43.8 \quad r_{13} = +84.0 \quad r_{15} = +217.0$
$r_{12} = -42.5 \quad r_{14} = +56.5 \quad r_{16} = +21.4$
$r_{17} = +15.2$ $d_7 = 6.2 \quad l_5 = 0.1 \quad l_6 = 0.1$
$d_8 = 2.1 \quad d_9 = 3.5 \quad d_{10} = 9.9$
$l_7 = 67.5$

Fig. 3

$n_D$
XI = 1.5332
XII = 1.5892
XIII = 1.5796
XIV = 1.5647

$\nu_D$
XI = 58.0
XII = 41.0
XIII = 53.8
XIV = 55.8

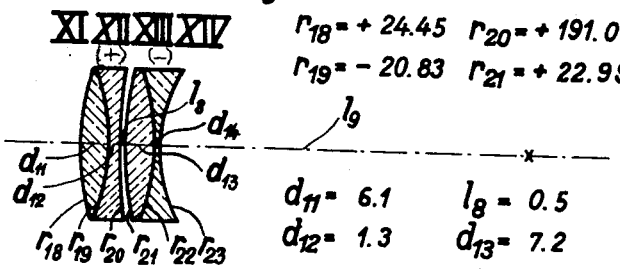

$r_{18} = +24.45 \quad r_{20} = +191.0 \quad r_{22} = -16.40$
$r_{19} = -20.83 \quad r_{21} = +22.99 \quad r_{23} = +13.04$ $d_{11} = 6.1 \quad l_8 = 0.5 \quad d_{14} = 1.2$
$d_{12} = 1.3 \quad d_{13} = 7.2 \quad l_9 = 68.3$

Fig. 4

Inventor:
Albert König

Patented May 16, 1939

2,158,507

UNITED STATES PATENT OFFICE 2,158,507

TELESCOPE OBJECTIVE

Albert König, Jena, Germany, assignor to the firm of Carl Zeiss, Jena, Germany

Application June 12, 1937, Serial No. 147,833
In Germany June 24, 1936

6 Claims. (Cl. 88—57)

An application has been filed in Germany, June 24, 1936.

Gauss devised a telescope objective corrected spherically and chromatically which consists of a convergent member facing the object and a dispersive member facing the observer's eye and in which the condition of neutralizing the error in sphere, first discovered by d'Alembert, is arrived at in two places of the solar spectrum with only a small, and therefore harmless, departure from the sine law. The lens surfaces being curved comparatively much, this objective is especially sensitive as regards centring errors.

The invention concerns an objective of similar construction which is corrected chromatically, spherically and for coma and whose astigmatic error is smaller than 15 thousandths of the focal length with respect to those principal rays which include with the optical axis an angle of 10°, the said error being, accordingly, no greater than half the error in the known objective. The space between the two members of the new objective is at most equal to one seventh of the focal length of the objective and bounded by surfaces the radii of curvature of which are greater than the radii of curvature of the corresponding outer surfaces of the objective. With a view to obtaining greater radii of curvature of the refractive surfaces, so as to render an objective of the said kind as insensitive as possible to centring errors, this objective can be so constructed according to the invention that at least one of the two members consists of at least two lenses and that two adjacent surfaces of two different lenses of this one member are so curved in an equal sense as to make the concave sides of these two surfaces receive the incident light, the sum of the refractive powers of these two surfaces being between one tenth of the positive and nine tenths of the negative reciprocal magnitude of the focal length of the objective.

Especially great insensitiveness to centring errors and favourable magnitudes of spherical correction ensuring an especially great ratio of aperture can be obtained by composing the convergent member facing the object of two convergent lenses or groups of lenses.

It is convenient to provide that the length of the objective in the optical axis, increased by the thickness of the member facing the observer's eye, is no smaller than one tenth of the focal length of the objective. The distance apart of that surface of the objective which faces the object and the corresponding focus is in this case smaller than the focal length, as is the case in teleobjectives, and, on account of better approximation to the Petzval condition, astigmatic correction is improved. If the said adjacent surfaces in one of the members are made dispersive and cemented to each other, losses due to reflection of the objective will be smaller, and the radii of curvature of these surfaces can be comparatively small without the sensitiveness with respect to centring errors being impaired. Using the dispersive cemented surfaces in the convergent member facing the object offers the advantage of a neutralization of the chromatic difference in magnification entailing a reduction of the chromatic longitudinal deviation, and, reversely, neutralization of the chromatical longitudinal deviation entails reduction of the difference in magnification.

The objective can be further improved by disposing in one of the two members a convergent cemented surface. This improvement consists in the possibility of using a greater ratio of aperture, because the spherical correction can be ameliorated.

Not only can the new objective be used as a telescope objective, but it will render equally good services especially as part of a reversing system of telescopes.

Figures 1 to 4 of the accompanying drawing illustrate four telescope objectives as constructional examples of the invention. In all these examples, the total focal length is assumed to be 100. The member facing the object and the member facing the observer's eye are termed front member and rear member, respectively.

The first constructional example, Figure 1, has a convergent front and a dispersive rear member. The front member consists of a convergent lens I and a dispersive lens II, which are cemented together, and the rear member is a dispersive lens III.

The second constructional example, Figure 2, has a front member, which is a convergent single lens IV, and a rear member consisting of a convergent lens V and a dispersive lens VI, which are cemented together and have a dispersive effect.

In the third constructional example, Figure 3, the front member is convergent and composed of two cemented lenses and a single lens. The two cemented lenses are a convergent lens VII and a dispersive lens VIII, which constitute a convergent group of lenses. Also the single lens, designated IX, is convergent. The rear member of this example is a dispersive single lens X.

In the fourth constructional example, Figure 4, the front as well as the rear member are composed of two lenses cemented together. The front member is convergent and consists of a convergent lens XI and a dispersive lens XII. The rear member, composed of a convergent lens XIII and a dispersive lens XIV, is dispersive In the following tables, the kinds of glass of the lenses according to the four examples are determined by the refractive indices $n_D$ and the Abbe figures $\nu_D$ of the line D of the solar spectrum, reference being had also to the radii of curvature $r$, the thicknesses $d$, and the distances $l$.

*First example (Fig. 1)*

|  | I | II | III |
|---|---|---|---|
| $n_D$ | 1.5209 | 1.6646 | 1.5163 |
| $\nu_D$ | 60.2 | 35.7 | 64.0 |

$r_1 = +20.8$   $d_1 = 2.9$
$r_2 = -37.3$   $d_2 = 1.3$
$r_3 = +195.0$  $l_1 = 0.1$
$r_4 = +21.4$   $d_3 = 8.5$
$r_5 = +12.01$  $l_2 = 71.0$

*Second example (Fig. 2)*

|  | IV | V | VI |
|---|---|---|---|
| $n_D$ | 1.6031 | 1.5687 | 1.6646 |
| $\nu_D$ | 60.7 | 63.1 | 35.7 |

$r_6 = 37.9$    $d_4 = 4.0$
$r_7 = +328.0$  $l_3 = 0.2$
$r_8 = +21.6$   $d_5 = 7.0$
$r_9 = -186.0$  $d_6 = 5.0$
$r_{10} = +14.88$ $l_4 = 66.6$

*Third example (Fig. 3)*

|  | VII | VIII | IX | X |
|---|---|---|---|---|
| $n_D$ | 1.5725 | 1.6200 | 1.5163 | 1.5688 |
| $\nu_D$ | 57.5 | 36.3 | 64.0 | 56.0 |

$r_{11} = +43.8$  $d_7 = 6.2$
$r_{12} = -42.5$  $d_8 = 2.1$
$r_{13} = +84.0$  $l_5 = 0.1$
$r_{14} = +56.5$  $d_9 = 3.5$
$r_{15} = +217.0$ $l_6 = 0.11$
$r_{16} = +21.4$  $d_{10} = 9.9$
$r_{17} = +15.2$  $l_7 = 67.5$

*Fourth example (Fig. 4)*

|  | XI | XII | XIII | XIV |
|---|---|---|---|---|
| $n_D$ | 1.5332 | 1.5892 | 1.5796 | 1.5647 |
| $\nu_D$ | 58.0 | 41.0 | 53.8 | 55.8 |

$r_{18} = +24.45$  $d_{11} = 6.1$
$r_{19} = -20.83$  $d_{12} = 1.3$
$r_{20} = +191.$—  $l_8 = 0.5$
$r_{21} = +22.99$  $d_{13} = 7.2$
$r_{22} = -16.4$   $d_{14} = 1.2$
$r_{23} = +13.04$  $l_9 = 68.3$

I claim:

1. A telescope objective corrected chromatically, astigmatically, spherically and for coma, this objective consisting of a convergent front member and a dispersive rear member axially spaced apart, the distance apart of said two members being greater than zero and at most equal to one seventh of the focal length of the telescope objective, the radii of curvature of the bounding surfaces of the space between said two members being greater than the radii of curvature of the corresponding outer surfaces of said objective, the radius of curvature of the front bounding surface of said space being at most infinitely great, the radius of curvature of the rear bounding surface of said space being at most twice the radius of the rear bounding surface of said objective, at least one of said two members consisting of two lenses, the concave sides of two directly opposite surfaces of two different lenses of last said member facing the incident light, the sum of the refractive powers of said two surfaces being equal to at least the product of −0.9 and the reciprocal magnitude of the focal length of the objective and to at most the product of +0.1 and the said reciprocal magnitude.

2. In a telescope objective according to claim 1, said convergent front member consisting of two elements, said elements including an air space, the front element of said member consisting of two lenses, the rear element of said member being a single lens.

3. In a telescope objective according to claim 1, the length of the telescope objective being in the optical axis at least equal to the tenth part of the focal length of the objective, reduced by the thickness of said dispersive rear member.

4. A telescope objective corrected chromatically astigmatically, spherically and for coma, this objective consisting of a convergent front member and a dispersive rear member axially spaced apart, the distance apart of said two members being greater than zero and at most equal to one seventh of the focal length of the telescope objective, the radii of curvature of the bounding surfaces of the space between said two members being greater than the radii of curvature of the corresponding outer surfaces of sair objective, the radius of curvature of the front bounding surface of said space being at most infinitely great, the radius of curvature of the rear bounding surface of said space being at most twice the radius of the rear bounding surface of said objective, at least one of said two members consisting of two lenses, the concave sides of two directly opposite surfaces of two different lenses of last said member facing the incident light, the sum of the refractive powers of said two surfaces being equal to at least the product of −0.9 and the reciprocal magnitude of the focal length of the objective and to at most the product of +0.1 and said reciprocal magnitude, the two last said surfaces being dispersive and cemented to each other.

5. In a telescope objective according to claim 4, the two last said surfaces being surfaces of said convergent front member.

6. In a telescope objective according to claim 4, another pair of cemented surfaces, these latter surfaces being convergent.

ALBERT KÖNIG.